3,823,194
CATALYTIC EXCHANGE REACTION BETWEEN ALIPHATIC BROMIDES AND ALIPHATIC ALCOHOLS
Morris A. Johnson, James D. Reedy, and Kang Yang, Ponca City, Okla., assignors to Continental Oil Company, Ponca City, Okla.
No Drawing. Filed June 21, 1972, Ser. No. 265,083
Int. Cl. C07c 27/00, 29/00, 31/02
U.S. Cl. 260—642          10 Claims

ABSTRACT OF THE DISCLOSURE

A process for catalytically exchanging bromide ions for hydroxyl groups between aliphatic bromides and aliphatic alcohols wherein the bromides and alcohols are reacted in the presence of activated carbon, including activated charcoal.

This invention relates to a catalytic exchange reaction between aliphatic bromides and aliphatic alcohols. More specifically, the invention relates to an exchange reaction between aliphatic bromides and aliphatic alcohols in the presence of activated charcoal or activated carbon.

It has been suggested in German Pat. 664,321 to react methanol with chloroform or carbon tetrachloride in the presence of charcoal to produce some methyl chloride. It is also indicated in U.S. 1,834,089 that activated carbon will catalyze the exchange of alcoholic hydroxyl for the chlorine of hydrogen chloride to some degree. However, when attempting to exchange substituents between organic hydroxy compounds and an organic chloride wherein no more than a single chlorine atom is substituted on each carbon atom, no reaction has been observed even though conducted in the presence of charcoal.

In accordance with this invention, it has unexpectedly been found that an exchange reaction between certain aliphatic bromides and aliphatic alcohols will proceed in the presence of an activated charcoal or activated carbon. This was particularly surprising in view of the fact that the corresponding aliphatic chloride would not enter into an exchange reaction under similar conditions.

The aliphatic bromides which are suitable for use in the process of this invention include the bromine-substituted straight or branched-chain alkanes or alkenes having no more than one bromine substituent per carbon atom, provided that the alkenes are of the non-alpha type and have no bromine substitution on the double bond carbon atoms. Since the total carbon content and the total bromine substitution of these compounds may vary considerably, these aspects are not considered essential features of this invention. However, in most instances the total carbon content of the alkanes will generally range from about 1 to 30 carbon atoms, preferably from about 1 to 18 carbon atoms; the total carbon content of the alkenes will generally range from about 1 to 30 carbon atoms, preferably from about 3 to 18 carbon atoms; and the bromine substitution may be mono, di, or higher substituton, preferably the mono or di substitution. Some examples illustrating these compounds are 3-methyl-1-bromobutane; 2-bromobutane; 1-bromo-2-butene; 1-bromooctane; 1,4,8 - tribromododecane; 4 - ethyl - 1,3,5-tribromoheptadecane; 1 - bromo - 2 - nonadecene; 1-bromotetradecane; 1,4 - dibromobutane; 4,6,8 - tribromo-2-pentadecene, 6 - bromo-2-ethylhexene-1; 1,6-dibromohexane; 1 - bromo - 5 - methylhexane; ethyl bromide; methyl bromide; 1-bromopropane; 1,2 - dibromoethane; 2 - bromodecane; and the like. Obviously, the bromine-substituted alkenes as described above will have at least three carbon atoms. Mixtures of aliphatic bromides will be suitable as well.

The aliphatic alcohols suitable for use in the process of this invention are the branched or straight-chain, saturated or unsaturated aliphatic monohydric alcohols provided that the unsaturated aliphatic alcohols have no hydroxyl substitution on the double bond carbon atoms. Again, similarly as with the bromide reactants, the carbon content of the alcohols is not considered an essential feature of the invention but generally for the saturated alcohols will be in the range of about 1 to 30 carbon atoms, preferably in the range of about 1 to 18 carbon atoms, and for the unsaturated alcohols will be about 3 to 30 carbon atoms, preferably 3 to 18 carbon atoms. Some examples illustrating suitable alcohols are methanol, ethanol, propanol, isobutanol, 2-ethylhexanol, 4-hydroxy-butene-1,2-butyloctanol, 1-decanol, 1-heptadecanol, 1-hydroxy-2-butene, 1-hydroxy-2-hexyl-4-dodecene, 1-hydroxy-pentadecene-3, eicosanol, and the like. Mixtures of such alcohols may also be employed.

Obviously, when the bromide derivative and the hydroxyl derivative are based on the same aliphatic group, the reaction products of the process of this invention will correspond in identity to the reactants. For this reason, the process will generally be carried out with the bromide derivative and the hydroxyl derivative being based on different aliphatic groups.

While the reaction is not dependent upon the particular ratios of aliphatic bromides to alphatic alcohols, there will generally be employed a molar ratio of the bromide, reactant to the hydroxy reactant in the range of about 10:1 to about 1:10, preferably 3:1 to 1:3. It is further emphasized that these ratios are not essential features of the invention as the exchange reaction of the invention will proceed even when employing a large excess of one reactant in the presence of activated carbon, including activated charcoal.

The activated carbon, which unexpectedly enables the exchange reaction to proceed, may be employed in amounts ranging from about 0.1 to 150 weight percent based on the organic compounds. In general greater amounts will provide increased reaction rates. Preferably, the activated carbon is employed in an amount ranging from about 1 weight percent to about 50 weight percent based on the organic compounds.

The reacton will be generally conducted at temperatures of at least about 90° C. Higher temperatures may be employed so long as they do not lead to excessive degradation of either the reactants or the reaction products. It is preferred to operate within a range of about 130° C. to about 170° C. as this will provide the most desirable reaction rates while at the same time avoiding degradation.

Pressure is not a consderation in conducting the reaction except to the extent that pressure may be necessary to maintain the reactants and/or reaction products in a liquid state as desired. Thus, depending upon the reactants and reaction products, the reacttion may be carried out at subatmospheric, atmospheric, or superatmospheric conditions.

The reaction may be conducted by merely charging the reactants to a stirred vessel along with the activated charcoal or activated carbon and subjecting them to the stated conditions on a batch basis. Alternatively, the activated carbon may be formed into a fixed bed or fluidized bed, and the reactants may be passed through the bed on a continuous basis while being subjected to the stated conditons. In either event the reaction products may be recovered in accordance with standard techniques well-known in the chemistry field, e.g., distillation.

The following examples will serve to further illustrate the process of this invention.

EXAMPLE 1

The effectiveness of the process of this invention was demonstrated by charging 10 g. ethyl bromide and 3.2 g. methanol along with 5 g. activated charcoal to a 200 ml. stainless steel autoclave. The autoclave was sealed, heated to 150° C. and shaken at 225 r.p.m. for about 30 minutes. The reaction products were distilled from the autoclave into a cold trap cooled to liquid nitrogen temperature. A sample of the collected material was then analyzed by gas chromatography with the following results (area percentages): methanol—27.2%; ethyl bromide—50.2%; methyl bromide—10.6% and ethanol—12.0%.

EXAMPLE 2

In a further example of the process of the invention, the same procedure as described in Example 1 was followed except that 20.1 g. ethyl bromide, 6.55 g. methanol and 10 g. activated charcoal were charged to the autoclave. Gas chromatographic analysis of the reaction products gave the following results: methanol—15.0%; ethyl bromide—42.9%; methyl bromide—20.4% and ethanol—21.7%.

EXAMPLE 3

The procedure according to Example 2 was again repeated reusing the activated charcoal. A gas chromatographic analysis of the reaction products gave the results: methanol—14.6%; ethyl bromide—45.3% methyl bromide—19.9%; and ethanol—20.3%. Use of an internal standard on the gas chromatographic analysis indicated this corresponds to 1.94 g. methanol, 12.44 g. ethyl bromide, 5.50 g. methyl bromide and 3.15 g. ethanol.

EXAMPLE 4

For comparison purposes, the procedure according to Example 2 was repeated except that ethyl chloride was substituted for ethyl bromide in the reactants. Analysis of the reaction products by gas chromatography indicated that no methyl chloride nor ethanol was formed.

EXAMPLE 5

The procedure of Example 2 was again repeated twice for comparison, once by substituting chlorobenzene for ethyl bromide and once by substituting bromobenzene for ethyl bromide. In the former experiment, the reaction charge was subjected to 180° C. for about one hour, and in the latter the reaction charge was subjected to 200° C. for about one hour. Gas chromatography analysis of both reaction mixtures at the end of the reaction periods indicated no phenol was formed.

EXAMPLE 6

Following the procedure of Example 2 except that 3-methyl-1-bromobutane is substituted for ethyl bromide and 1-octanol is substituted for methanol, will give similar results.

EXAMPLE 7

Again following the procedure of Example 2 except for substituting 1,4-dibromobutane and dodecanol for ethyl bromide and methanol, respectively, will give similar results. The amount of dodecanol should be increased by a factor of two.

EXAMPLE 8

Similar results will be obtained by following the procedure of Example 2 except substituting 1-bromo-2-butene for ethyl bromide. In this case the 1-bromo-2-butene will be converted to 1-hydroxy-2-butene.

Thus, having described the invention in detail, it will be understood by those skilled in the art that certain variations and modifications may be made without departing from the spirit and scope of the invention as defined herein and in the appended claims.

We claim:

1. A process for catalytically exchanging bromide ions and hydroxyl groups between aliphatic bromides and aliphatic alcohols which comprises reacting aliphatic bromides with aliphatic alcohols in the presence of activated carbon at temperatures of at least about 90° C.; the aliphatic moieties of said aliphatic bromides being different from the aliphatic moieties of said aliphatic alcohols; said aliphatic bromides being bromine-substituted, straight or branched-chain, alkanes or alkenes, either of which has no more than one bromine substitutent per carbon atom, provided further that the alkenes are of the non-alpha type and have no bromine substitution on the double bond carbon atoms; and said aliphatic alcohols being straight or branched-chain alkanols or alkenols, provided further that the alkenols have no hydroxy substitution on the double bond carbon atoms.

2. A process according to Claim 1 wherein the alkanes have about 1 to 30 carbon atoms and the alkenes have about 3 to 30 carbon atoms.

3. A process according to Claim 2 wherein the alkanes have about 1 to 18 carbon atoms and the alkenes have about 3 to 18 carbon atoms.

4. A process according to Claim 1 wherein the aliphatic bromides are bromine-substituted alkanes.

5. A process according to Claim 1 wherein the alkanols have 1 to 30 carbon atoms and the alkenols have 3 to 30 carbon atoms.

6. A process according to Claim 5 wherein the alkanols have 1 to 18 carbon atoms and the alkenols have 3 to 18 carbon atoms.

7. A process according to Claim 1 wherein the aliphatic alcohols are alkanols.

8. A process according to Claim 1 wherein 0.1 to 150 weight percent, based on the organic compounds, of activated carbon is employed.

9. A process according to Claim 1 wherein the activated carbon is activated charcoal.

10. A process according to Claim 8 wherein the activated carbon is activateed charcoal.

References Cited

FOREIGN PATENTS 664,321  8/1938  Germany.

JOSEPH E. EVANS, Primary Examiner

U.S. Cl. X.R.

260—635 R, 643 G